United States Patent
Lin

(10) Patent No.: US 9,455,635 B2
(45) Date of Patent: Sep. 27, 2016

(54) SNUBBER CIRCUIT AND BUFFERING METHOD FOR SNUBBER CIRCUIT

(71) Applicant: FSP TECHNOLOGY INC., Taoyuan County (TW)

(72) Inventor: Kuo-Fan Lin, Taoyuan County (TW)

(73) Assignee: FSP TECHNOLOGY INC., Taoyuan, Taoyuan County (TW)

( * ) Notice: Subject to any disclaimer, the term of this patent is extended or adjusted under 35 U.S.C. 154(b) by 120 days.

(21) Appl. No.: 14/465,855

(22) Filed: Aug. 22, 2014

(65) Prior Publication Data

US 2015/0055262 A1 Feb. 26, 2015

Related U.S. Application Data

(60) Provisional application No. 61/868,592, filed on Aug. 22, 2013.

(51) Int. Cl.
*H02M 1/34* (2007.01)
*H02M 3/335* (2006.01)

(52) U.S. Cl.
CPC ......... *H02M 3/33507* (2013.01); *H02M 3/335* (2013.01); *H02M 2001/342* (2013.01); *H02M 2001/344* (2013.01); *Y02B 70/1491* (2013.01)

(58) Field of Classification Search
CPC ............. H02M 1/34; H02M 3/33507; H02M 2001/342; H02M 2001/344; Y02B 70/1491
USPC ........................................................ 361/91.7
See application file for complete search history.

(56) References Cited

U.S. PATENT DOCUMENTS

| | | | | | |
|---|---|---|---|---|---|
| 5,570,278 | A | * | 10/1996 | Cross | H02M 3/33569 363/131 |
| 5,594,326 | A | * | 1/1997 | Gilbert | G05F 3/227 323/313 |
| 5,661,642 | A | * | 8/1997 | Shimashita | H02M 3/33523 363/21.15 |

* cited by examiner

*Primary Examiner* — Scott Bauer
(74) *Attorney, Agent, or Firm* — Winston Hsu; Scott Margo

(57) ABSTRACT

A snubber circuit includes a capacitor and a buffer device. The buffer device has a first terminal and a second terminal. The first terminal is electrically connected to the capacitor. When the buffer device operates in a first conduction mode, a charge current flows from the second terminal to the first terminal through the buffer device. When the buffer device switches from the first conduction mode to a second conduction mode, the buffer device generates a discharge current which flows from the first terminal to the second terminal through the buffer device over a specific period of time, such that after the buffer device enters the second conduction mode, a relative maximum voltage level appearing first at the second terminal is lower than a voltage level at the first terminal.

15 Claims, 18 Drawing Sheets

US 9,455,635 B2

SNUBBER CIRCUIT AND BUFFERING METHOD FOR SNUBBER CIRCUIT

CROSS REFERENCE TO RELATED APPLICATIONS

This application claims the benefit of U.S. provisional application No. 61/868,592, filed on Aug. 22, 2013, the contents of which are incorporated herein by reference.

BACKGROUND OF THE INVENTION

1. Field of the Invention

The disclosed embodiments of the present invention relate to a snubber circuit, and more particularly, to a snubber circuit which has long recovery time even when operating in a fast switching mode, and a related buffering method for a snubber circuit.

2. Description of the Prior Art

FIG. 1 illustrates a DC-to-DC converter (flyback converter) 100 of a conventional switching power supply, wherein when a switch Q1 (i.e. a switching transistor) is turned off, leakage inductance of a transformer TX1 induces a voltage spike across two terminals of the switch Q1. The DC-to-DC converter 100 uses an RCD snubber 102 including a plurality of resistors RX and R1, a capacitor C1 and a diode D1 to reduce a primary-side ring current Id generated due to instantaneous switching, wherein the resistor R1 may be omitted. The RCD snubber 102 charges the capacitor C1 by conducting the primary-side ring current Id through the diode D1. As a reverse recovery time of the diode D1 is too short, the capacitor C1 cannot be fully discharged through the diode D1. Hence, a bleeder resistor (i.e. the resistor RX) is coupled in parallel with the capacitor C1 to consume the primary-side ring current Id, thus allowing a voltage across the two terminals of the switch Q1 to return to a normal level. However, the aforementioned bleeder resistor increases power losses and decreases power conversion efficiency of the switching power supply.

Thus, a novel snubber circuit is needed to reduce/eliminate unnecessary power losses in high speed switching circuits.

SUMMARY OF THE INVENTION

It is therefore one objective of the present invention to provide a snubber circuit which has a long recovery time even when operating in a fast switching mode, and a related buffering method for a snubber circuit to solve the above problems.

According to an embodiment of the present invention, an exemplary snubber circuit is disclosed. The exemplary snubber circuit comprises a capacitor and a buffer device. The buffer device has a first terminal and a second terminal. The first terminal is electrically connected to the capacitor. When the buffer device operates in a first conduction mode, a charge current flows from the second terminal to the first terminal through the buffer device. When the buffer device switches from the first conduction mode to a second conduction mode, the buffer device generates a discharge current which flows from the first terminal to the second terminal through the buffer device over a specific period of time, such that after the buffer device enters the second conduction mode, a relative maximum voltage level appearing first at the second terminal is lower than a voltage level at the first terminal.

According to an embodiment of the present invention, an exemplary buffering method is disclosed. The exemplary buffering method comprises the following steps: when a buffer device of the snubber circuit operates in a first conduction mode, conducting a charge current flowing through the buffer device, wherein a first terminal of the buffer device is electrically connected to a capacitor of the snubber circuit, and the charge current flows from a second terminal of the buffer device to the first terminal through the buffer device; and when the buffer device switches from the first conduction mode to a second conduction mode, generating a discharge current which flows from the first terminal to the second terminal through the buffer device over a specific period of time, such that after the buffer device enters the second conduction mode, a relative maximum voltage level appearing first at the second terminal is lower than a voltage level at the first terminal.

The proposed snubber circuit (and/or the proposed buffer device) has long reverse recovery time even when operating in a fast switching mode, thus reducing/eliminating power losses in high speed switching applications.

These and other objectives of the present invention will no doubt become obvious to those of ordinary skill in the art after reading the following detailed description of the preferred embodiment that is illustrated in the various figures and drawings.

DETAILED DESCRIPTION

In order to realize a snubber circuit capable of being employed in high speed switching applications and having low power consumption, a conventional snubber is tested and analyzed to obtain circuit characteristics thereof. Next, a buffer device employed in a snubber circuit is proposed according to test/analysis results. Further description is detailed below.

Figure 1:
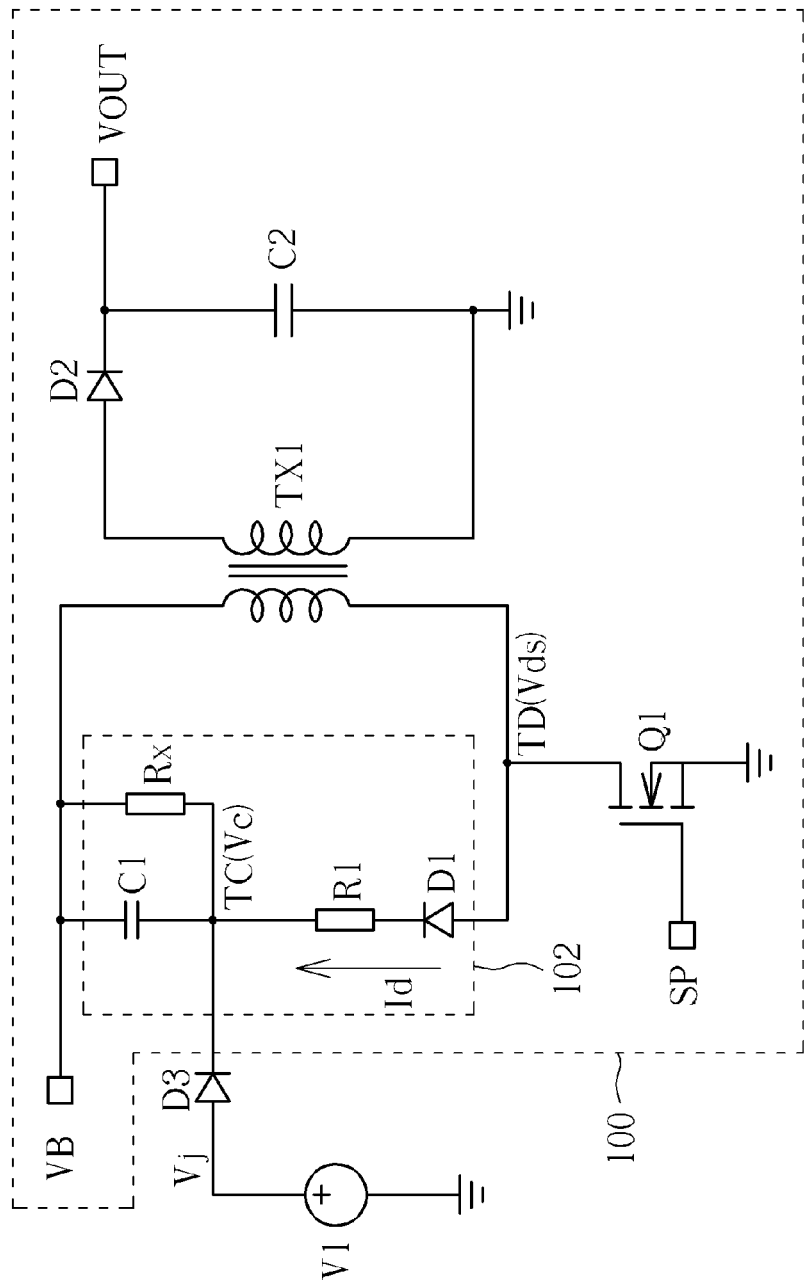
FIG. 1 illustrates a circuit architecture for testing a conventional snubber.

Please refer to FIG. 1 again. FIG. 1 further illustrates a circuit architecture for testing a conventional snubber according to an embodiment of the present invention. As shown in FIG. 1, the RCD snubber 102 is disposed on a primary side of the DC-to-DC converter 100 including the transformer TX1, the switch Q1, a diode D2 and a capacitor C2. As a person skilled in the art should understand that the DC-to-DC converter 100 converts an input voltage VB into an output voltage VOUT according to a control signal SP (e.g. a pulse width modulation (PWM) signal), further description is omitted here for brevity. The circuit architecture shown in FIG. 1 further includes a voltage source V1 and a diode D3, wherein the voltage source V1 may be used for power testing, and it may impose a voltage on a terminal TC to make the RCD snubber 102 enter a non-convergence mode. In this embodiment, an output of the voltage source V1 is 400 volts (i.e. a voltage level of a voltage signal Vj equals 400 volts), the diode D1 shown in FIG. 1 is implemented by a diode having a long recovery time (e.g. a diode of part number 1N4007G), and the resistor RX (i.e. a bleeder resistor) is implemented by a high resistance (10 Mohm) resistor.

Figure 2:
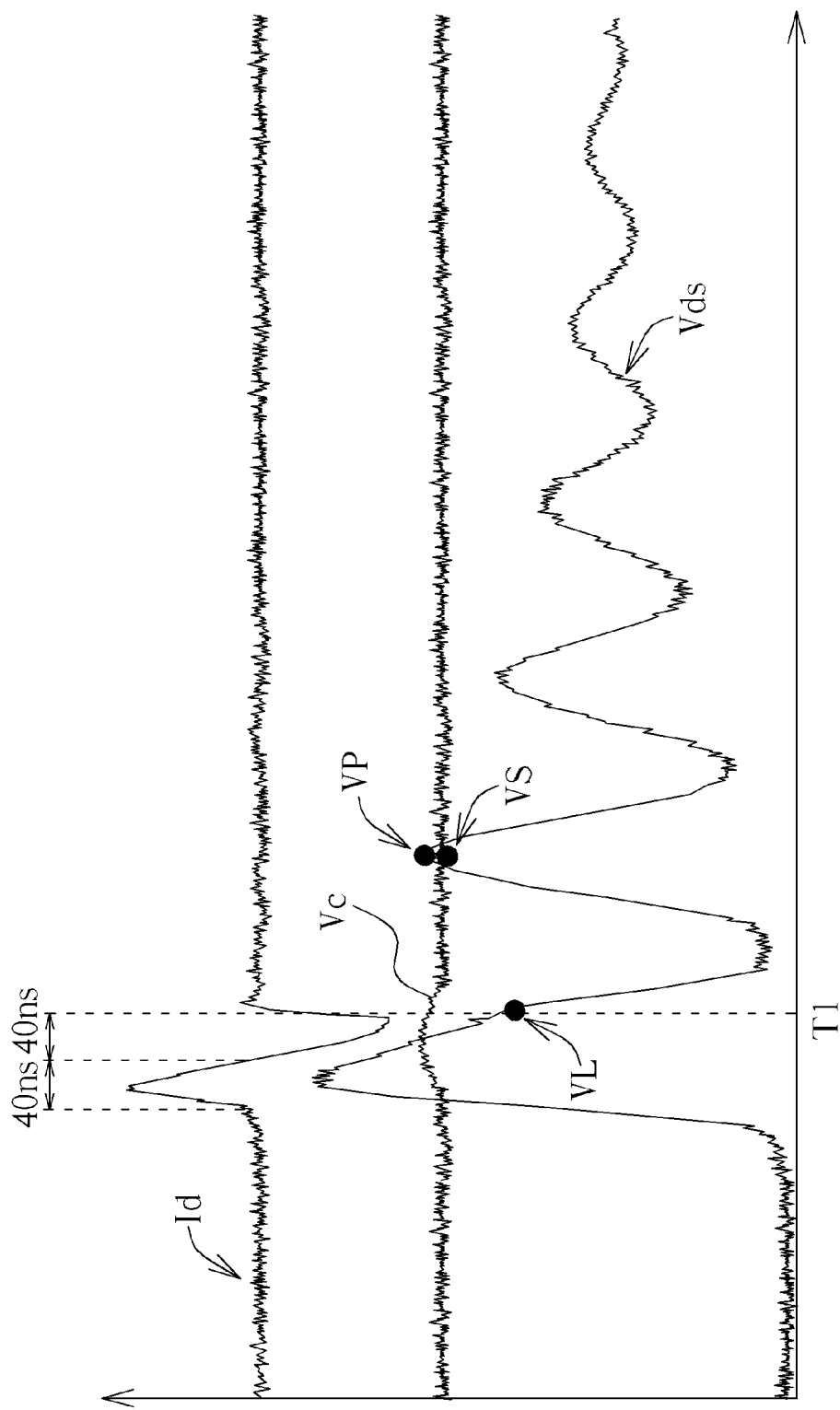
FIG. 2 is a diagram illustrating signal waveforms generated in the circuit architecture shown in FIG. 1.
Figure 3:
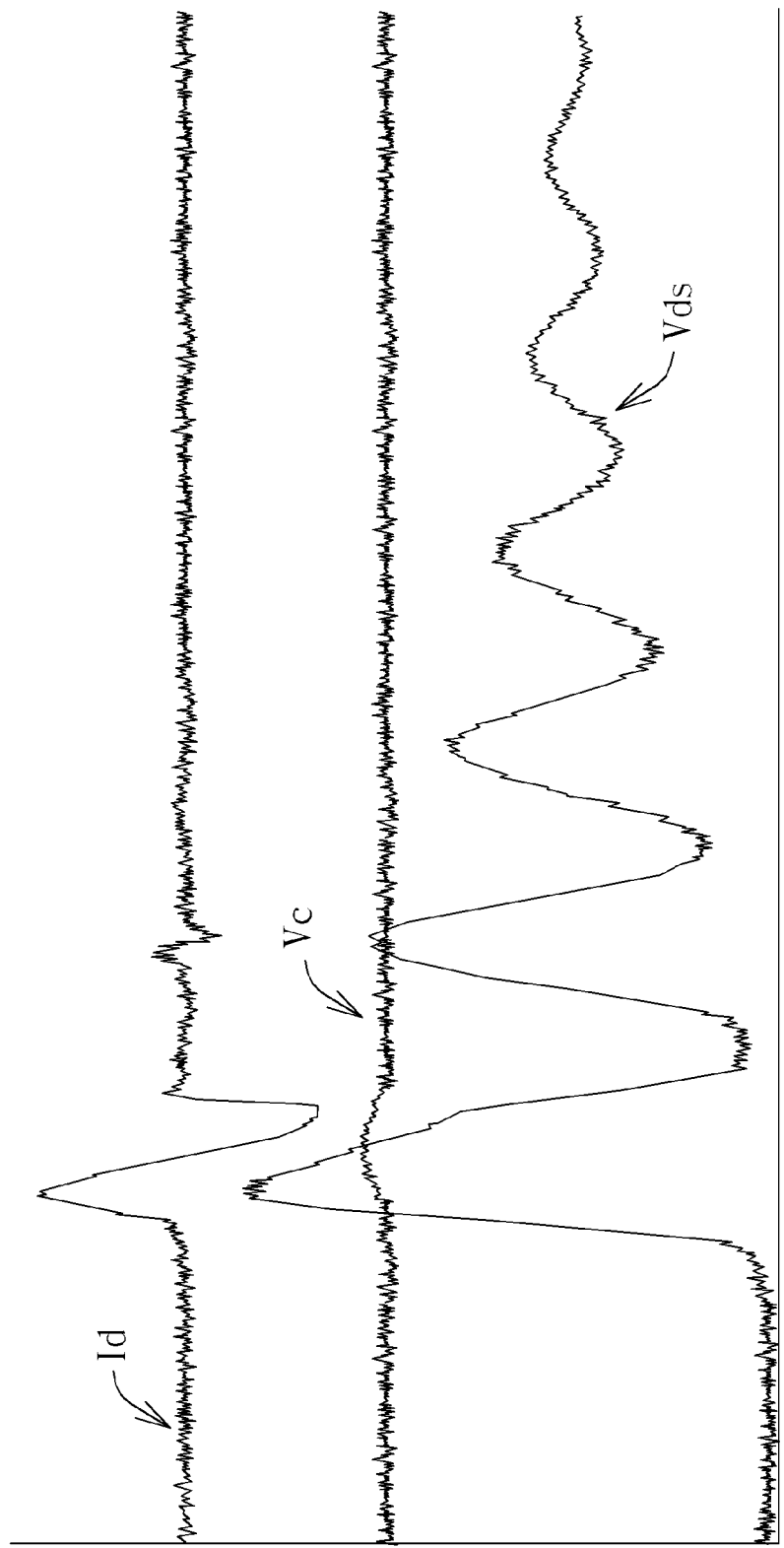
FIG. 3 is a diagram illustrating signal waveforms generated in the circuit architecture shown in FIG. 1.

Please refer to FIG. 1 and FIG. 2 together. FIG. 2 is a diagram illustrating waveforms of a voltage signal Vc present at the terminal TC, a voltage signal Vds present at a terminal TD and the primary-side ring current Id shown in FIG. 1 according to an embodiment of the present invention. As shown in FIG. 2, each of a duration of forward flow (from the diode D1 to the resistor R1) and a duration of reverse flow (from the resistor R1 to the diode D1) of the primary-side ring current Id is relatively short. The duration of reverse flow is shorter than 2 µs. For example, the duration of forward flow is 40 ns, and the duration of reverse flow is 40 ns. Hence, a relative maximum voltage level VP (bounce point), which appears first at the terminal TD after the diode D1 is cut off (time T1), is higher than a voltage level VL at the terminal TD at the point in time T1, and is even higher than a voltage level VS at the terminal TC. In other words, when the RCD snubber 102 employs a high resistance bleeder resistor (the resistor RX), the capacitor C1 cannot fully discharge due to the relatively short duration of reverse flow of the diode D1, making it difficult to reduce the voltage spike across the two terminals of the switch Q1 (the voltage signal Vds). Additionally, even in a case where the output of the voltage source V1 is lowered to 0 volt (i.e. the voltage level of the voltage signal Vj equals 0 volt), the aforementioned positive feedback still occurs on the primary side of the DC-to-DC converter 100 (please refer to signal waveforms shown in FIG. 3). In other words, in a case where the voltage level of the voltage signal Vc is changed within a relatively short period of time so as to make the RCD snubber 102 enter the non-convergence mode, the diode D1 actually presents relatively short recovery time, resulting in the positive feedback occurring on the primary side of the DC-to-DC converter 100.

Figure 4:
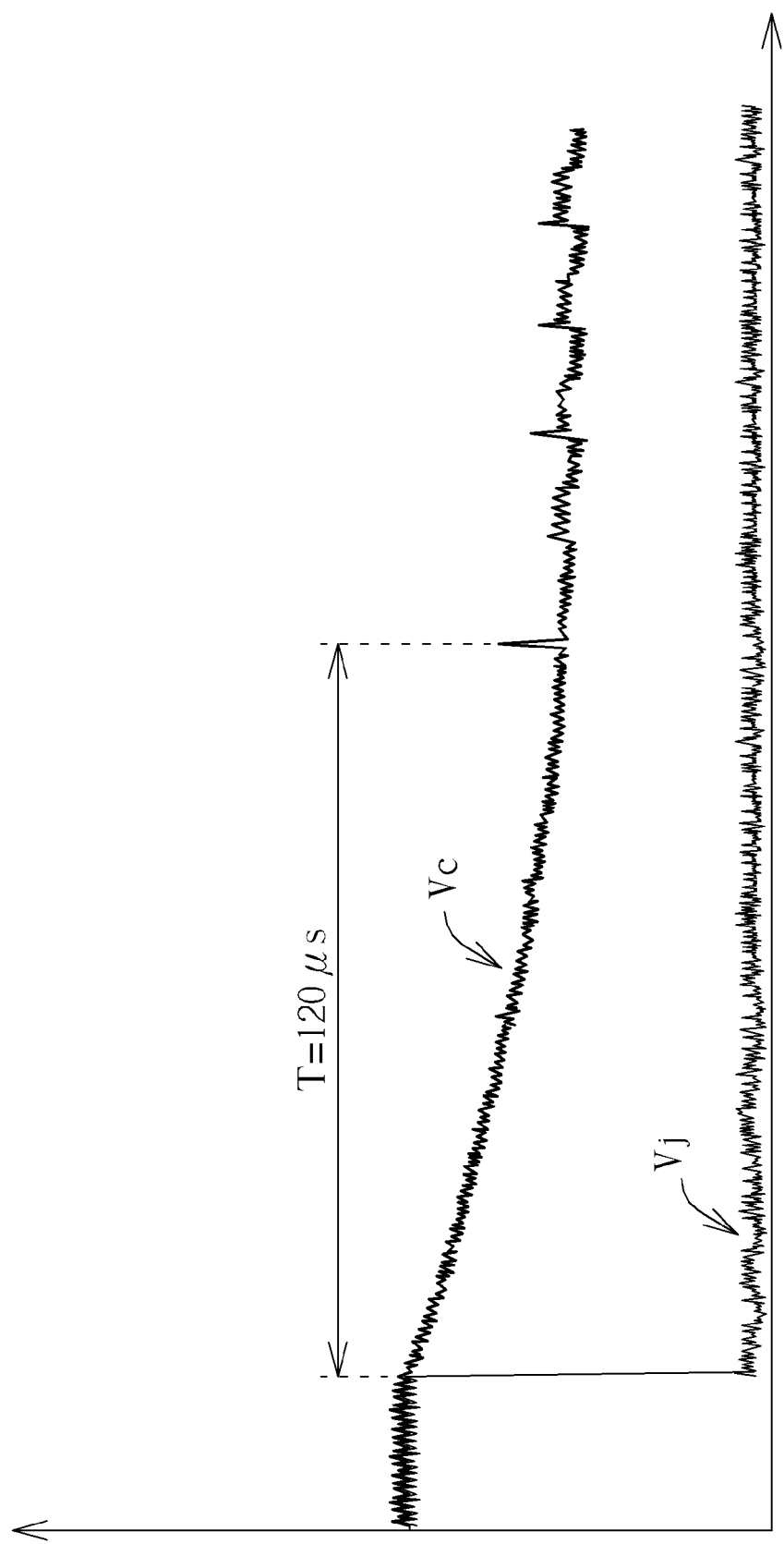
FIG. 4 is a diagram illustrating signal waveforms generated in the circuit architecture shown in FIG. 1.
Figure 5:
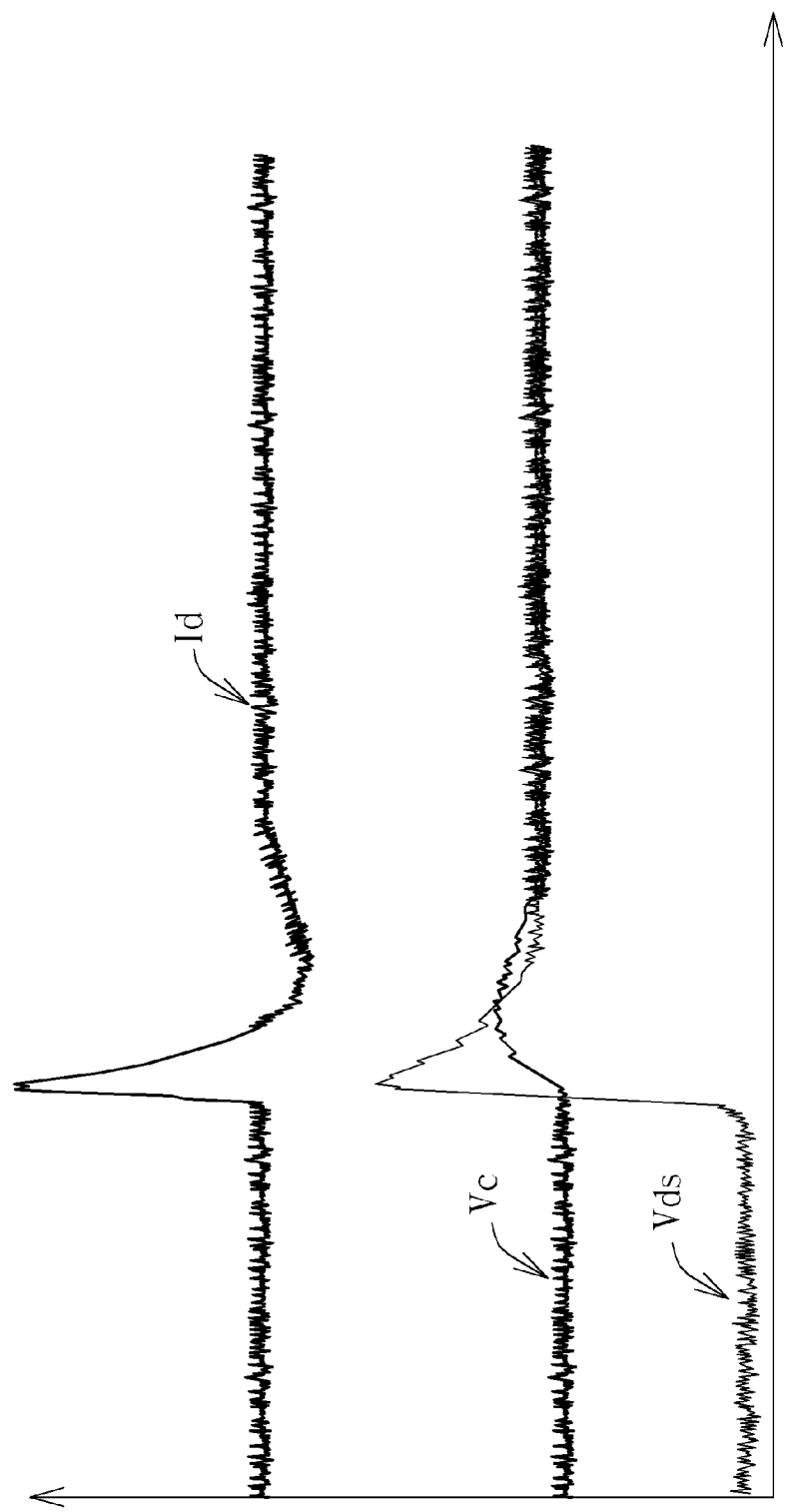
FIG. 5 is a diagram illustrating signal waveforms generated in the circuit architecture shown in FIG. 1.

Please refer to FIG. 1, FIG. 4 and FIG. 5 together. FIG. 4 is a diagram illustrating signal waveforms generated in the circuit architecture shown in FIG. 1 according to another embodiment of the present invention. In this embodiment, the voltage source V1 outputs 400 volts first and then 0 volts, and the resistor RX shown in FIG. 1 is implemented by a resistor having a lower resistance (100 kohm). As can been seen from the waveform of the voltage signal Vc shown in FIG. 4, the capacitor C1 may discharge gradually with the aid of the resistor RX and its discharging time constant T is 120 µs. When the RCD snubber 102 operates in a steady state (please refer to signal waveforms shown in FIG. 5), the duration of reverse flow (from the resistor R1 to the diode D1) of the primary-side ring current Id is longer than the duration of reverse flow shown in FIG. 2/FIG. 3.

In view of the above, a conventional snubber employing a low speed diode cannot effectively limit a ring current caused by fast switching. Although a bleeder resistor may reduce the ring current, the power loss increases. Based on the above observations, a snubber circuit capable of effectively limiting a ring current without a bleeder resistor is provided. The proposed snubber circuit may include a buffer device, which has a long reverse recovery time in a fast switching mode to thereby replace a diode included in a conventional RCD snubber. When employed in a snubber circuit, the proposed buffer device can effectively limit a primary-side ring current and reduce the voltage spike across the switch Q1 even if no bleeder resistor or a high resistance bleeder resistor is placed therein.

Figure 6:
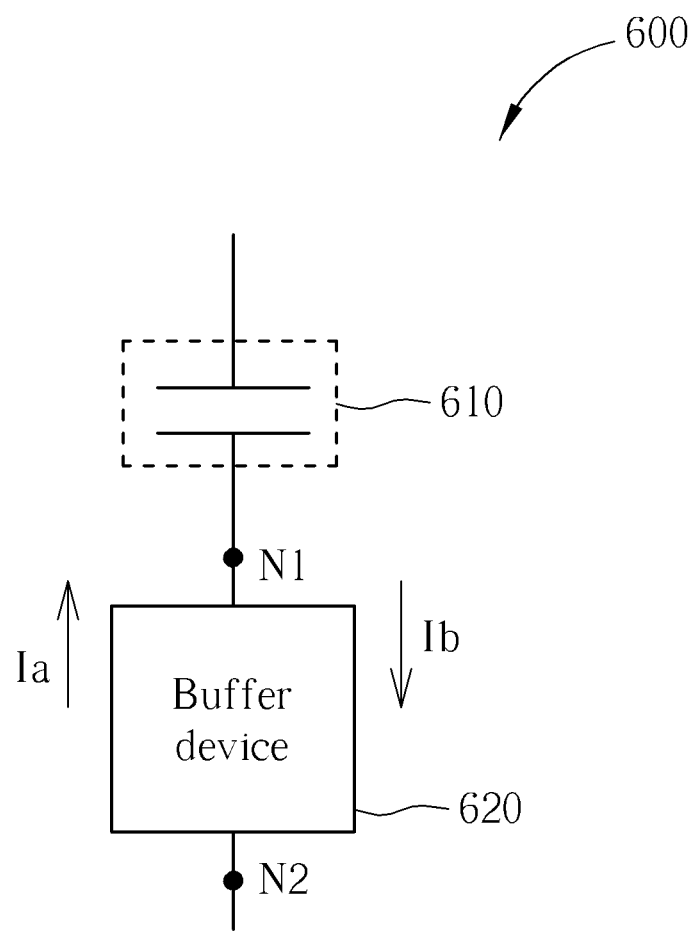
FIG. 6 is a diagram illustrating an exemplary snubber circuit according to an embodiment of the present invention.

Please refer to FIG. 6, which is a diagram illustrating an exemplary snubber circuit according to an embodiment of the present invention. The snubber circuit 600 includes a capacitor 610 and a buffer device 620, wherein the buffer device 620 has a terminal N1 and a second terminal N2, and the terminal N1 is electrically connected to the capacitor 610. The snubber circuit 600 may replace a conventional snubber. By way of example but not limitation, the RCD snubber 102 shown in FIG. 1 may be replaced by the snubber circuit 600, wherein the snubber circuit 600 may be coupled between the input voltage VB and the terminal TD shown in FIG. 1. The buffer device 620 may operate in a first conduction mode and a second conduction mode. In the first conduction mode, a charge current Ia may flow from the terminal N2 to the terminal N1 through the buffer device 620. When the buffer device 620 switches from the first conduction mode to a second conduction mode, the buffer device 620 may generate a discharge current Ib, wherein the discharge current Ib may flow from the terminal N1 to the terminal N2 through the buffer device 620 over a specific period of time, such that after the buffer device 620 enters the second conduction mode, a relative maximum voltage level appearing first at the terminal N2 is lower than a voltage level at the terminal N1. In one implementation, the relative maximum voltage level may be further lower than a voltage level at the terminal N2 generated when the discharge current Ib flows from the terminal N1 to the terminal N2 and reaches a minimum value. In brief, the snubber circuit 600 may have negative feedback characteristics.

For example, in a case where the snubber circuit 600 is employed in the circuit architecture shown in FIG. 1 (i.e. the RCD snubber 102 is replaced by the snubber circuit 600), the capacitor 610 is coupled between the input voltage VB and the terminal TC, the terminal N1 is coupled to the terminal TC, and the terminal N2 is coupled to the terminal TD. When the buffer device 620 operates in the first conduction mode (corresponding to a case where the diode D1 conducts a forward current), the charge current Ia may flow through the buffer device 620 to charge the capacitor 610. When the buffer device 620 operates in the second conduction mode (corresponding to a case where the diode D1 conducts a reverse current), the discharge current Ib may flow through the buffer device 620 to discharge the capacitor 610. In this embodiment, when the buffer device 620 switches from the first conduction mode to the second conduction mode, the charge current Ia may decrease to zero before the buffer device 620 generates the discharge current Ib (corresponding to a case where the current flowing through the diode D1 shown in FIG. 1 changes from positive to negative). Additionally, the negative feedback characteristics of the snubber circuit 600 may avoid that a voltage level of the voltage signal Vds is higher than a voltage level of the voltage signal Vc.

Figure 7:
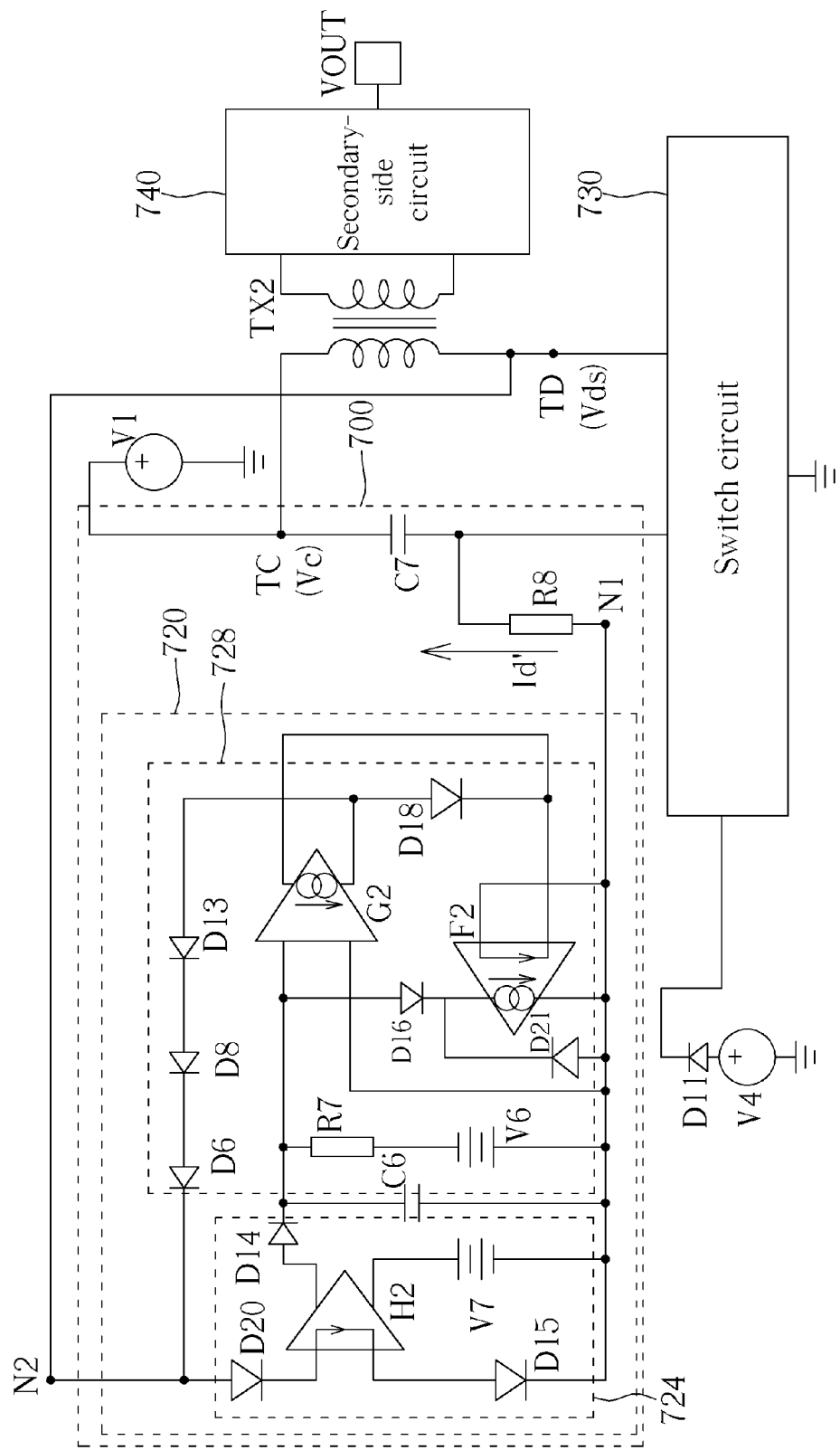
FIG. 7 is an implementation of the snubber circuit shown in FIG. 6.

The snubber circuit 600 shown in FIG. 6 is a basic architecture based on concept of the present invention. Any circuit employing the architecture shown in FIG. 6 falls within the scope of the present invention. To facilitate an understanding of the present invention, exemplary implementations of the proposed circuit architecture shown in FIG. 6 are given in the following for further description. It should be noted that other circuit implementations employing the architecture shown in FIG. 6 are feasible. Please refer to FIG. 7, which is an implementation of the snubber circuit 600 shown in FIG. 6. The circuit architecture shown in FIG. 7 is based on the circuit architecture shown in FIG. 1, wherein the RCD snubber 102, the transformer TX1, the switch Q1, the voltage source V1 and the diode D3 shown in FIG. 1 may be replaced by a snubber circuit 700, a transformer TX2, a switch circuit 730, a voltage source V4 and a diode D11 shown in FIG. 7. Additionally, a secondary-side circuit 740 shown in FIG. 7 may include a diode and a voltage source (not shown in FIG. 7) to implement operations of a secondary-side circuit of the transformer TX1 shown in FIG. 1. However, the implementation of the secondary-side circuit 740 is for illustrative purposes only, and is not meant to be a limitation of the present invention.

The architecture of the snubber circuit 700 is based on that of the architecture of the snubber circuit 600, and may include a capacitor C7 and a buffer device 720. The buffer device 720 may be used to implement the buffer device 620 shown in FIG. 6, and may be coupled between the terminal N1 and the terminal N2. In addition, the snubber circuit 700 may further include a resistor R8, which may be omitted. In this embodiment, the buffer device 720 may include a charge storage device (implemented by a capacitor C6 in this embodiment), a first conversion circuit 724 and a second conversion circuit 728. The first conversion circuit 724 is coupled to the capacitor C6 and is electrically connected between the terminal N1 and the terminal N2 (or between the terminal TC and the terminal TD), wherein when the buffer device 720 operates in a first conduction mode (i.e. a charge current flows into the buffer device 720 from the terminal N2; a primary-side ring current Id' has a current level greater than zero), the first conversion circuit 724 is arranged for converting the charge current into charges and storing the converted charges into the capacitor C6. By way of example but not limitation, the first conversion circuit 724 may include a plurality of diodes D14, D15 and D20, a DC (direct current) power V7 and an amplification circuit H2. After the charge current flows into the diode D20 from the terminal N2, an output current of the amplification circuit H2 may be used to charge the capacitor C6.

The second conversion circuit 728 is coupled to the capacitor C6 and is electrically connected between the terminal N1 and the terminal N2 (or between the terminal TC and the terminal TD), wherein when the buffer device 720 switches from the first conduction mode to the second conduction mode (i.e. a discharge current flows out of the buffer device 720 from the terminal N2; a primary-side ring current Id' has a current level less than zero), the second conversion circuit 728 is arranged for converting the charges stored in the capacitor C6 to generate the discharge current. By way of example but not limitation, the second conversion circuit 728 may include a plurality of diodes D6, D8, D13, D14, D16 and D21, a DC power V6, a resistor R7, and a plurality of current transformers F2 and G2. After the buffer device 720 switches from the first conduction mode to the second conduction mode, a corresponding current conduction path may be defined in sequence by the current transformer F2, the current transformer G2, the diode D13, the diode D8 and the diode D6. Hence, the charges stored in the capacitor C6 may be converted into the discharge current, and a duration of the discharge current flowing from the terminal N1 to the terminal N2 may be extended. Further, In this embodiment, when the buffer device 720 switches from the first conduction mode to the second conduction mode, the first conversion circuit 724 may convert the charge current until the charge current decreases to zero, and then the second conversion circuit 728 may convert the charges stored in the capacitor C6 to generate the discharge current (i.e. the primary-side ring current Id' changes from positive to negative).

The switch circuit 730 may include a plurality of voltage sources, a plurality of diodes, a plurality of resistors, a plurality of capacitors and/or a plurality of switches (not shown in FIG. 7) to implement operations of a switch transistor. Please note that the aforementioned implementations are for illustrative only, and are not meant to be limitations of the present invention.

Figure 8:
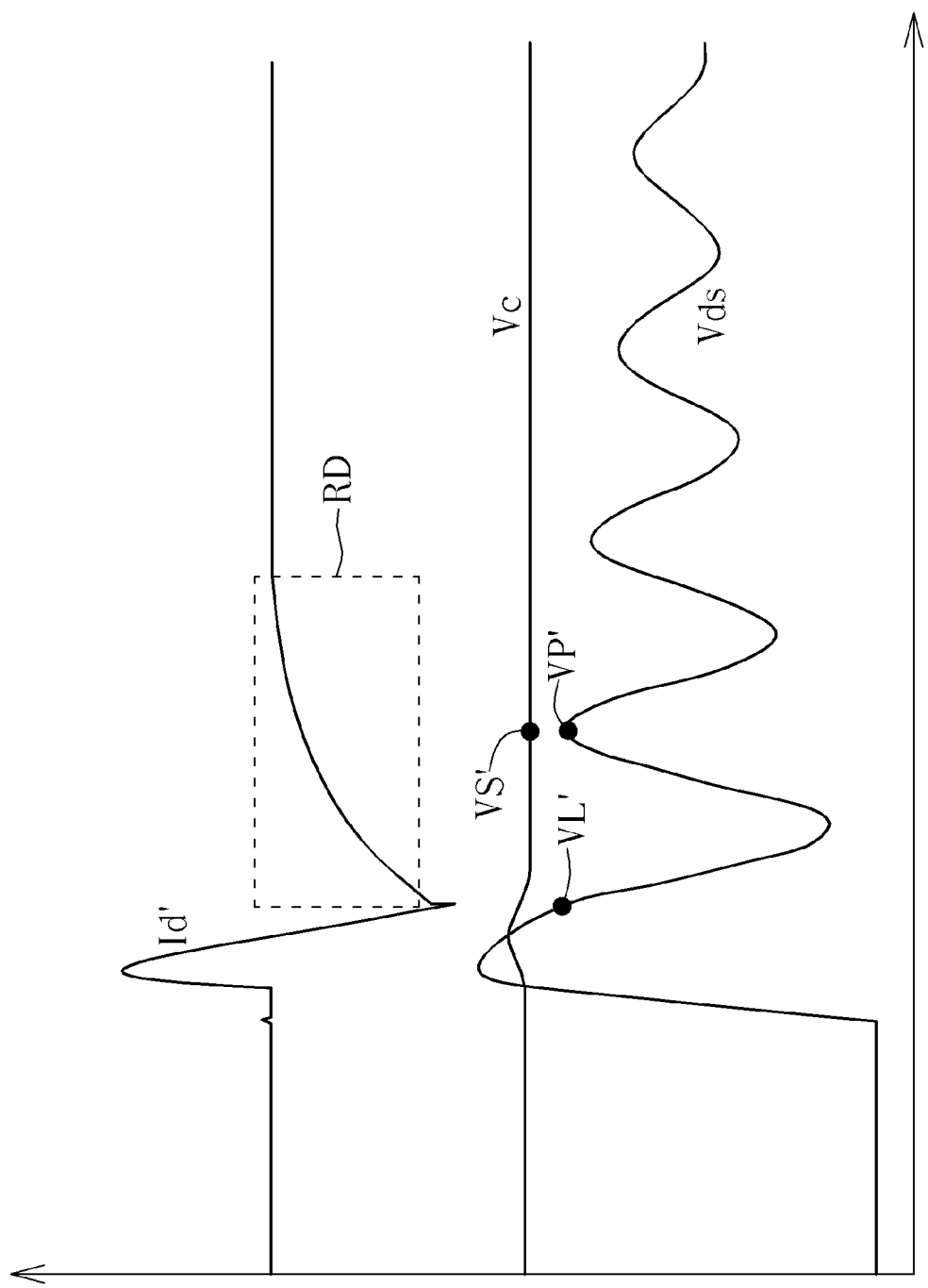
FIG. 8 is a diagram illustrating signal waveforms generated using the power source shown in FIG. 7 for power testing.
Figure 9:
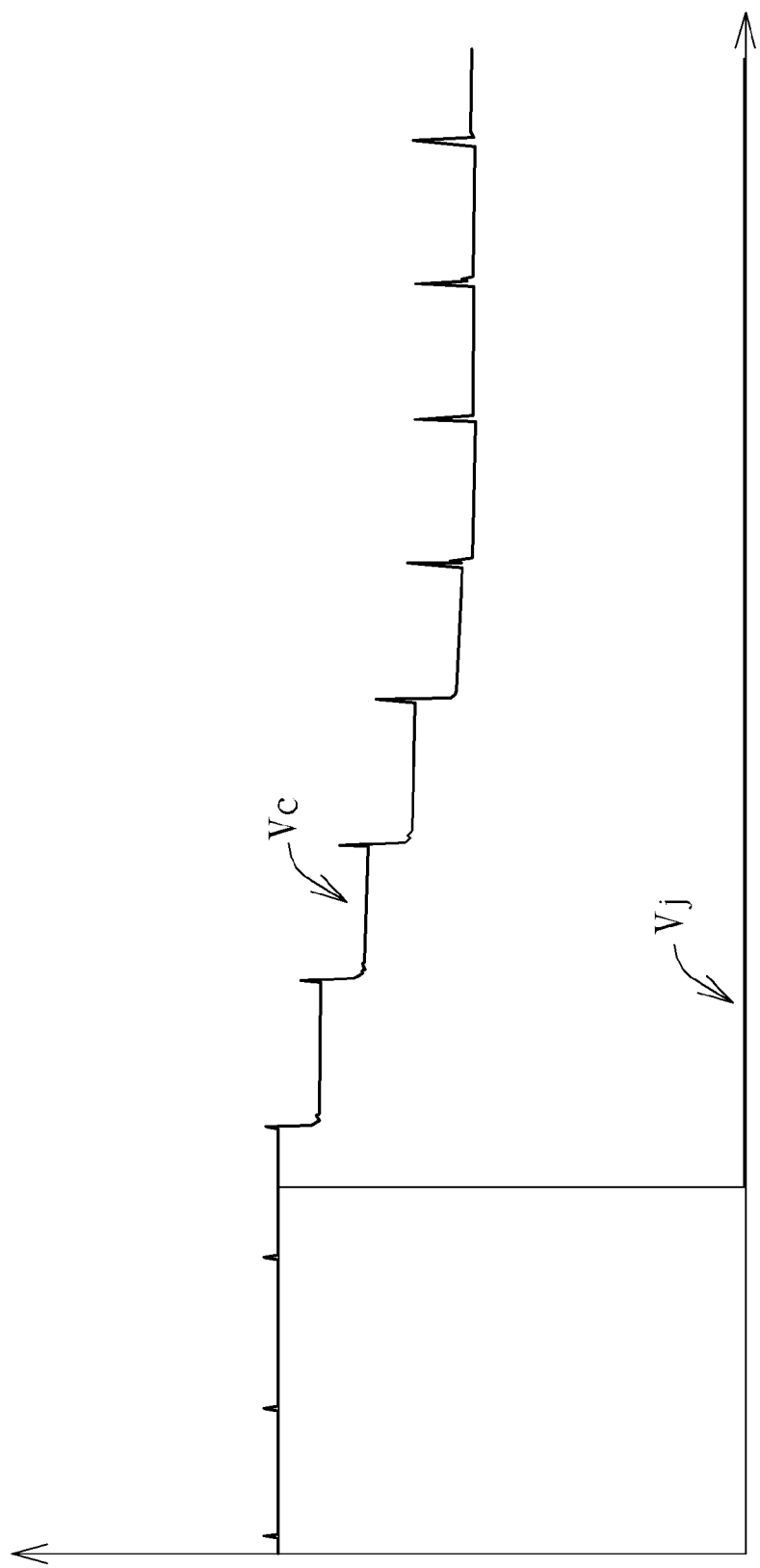
FIG. 9 is a diagram illustrating signal waveforms generated using the power source shown in FIG. 7 which outputs a high voltage first and then a low voltage.
Figure 10:
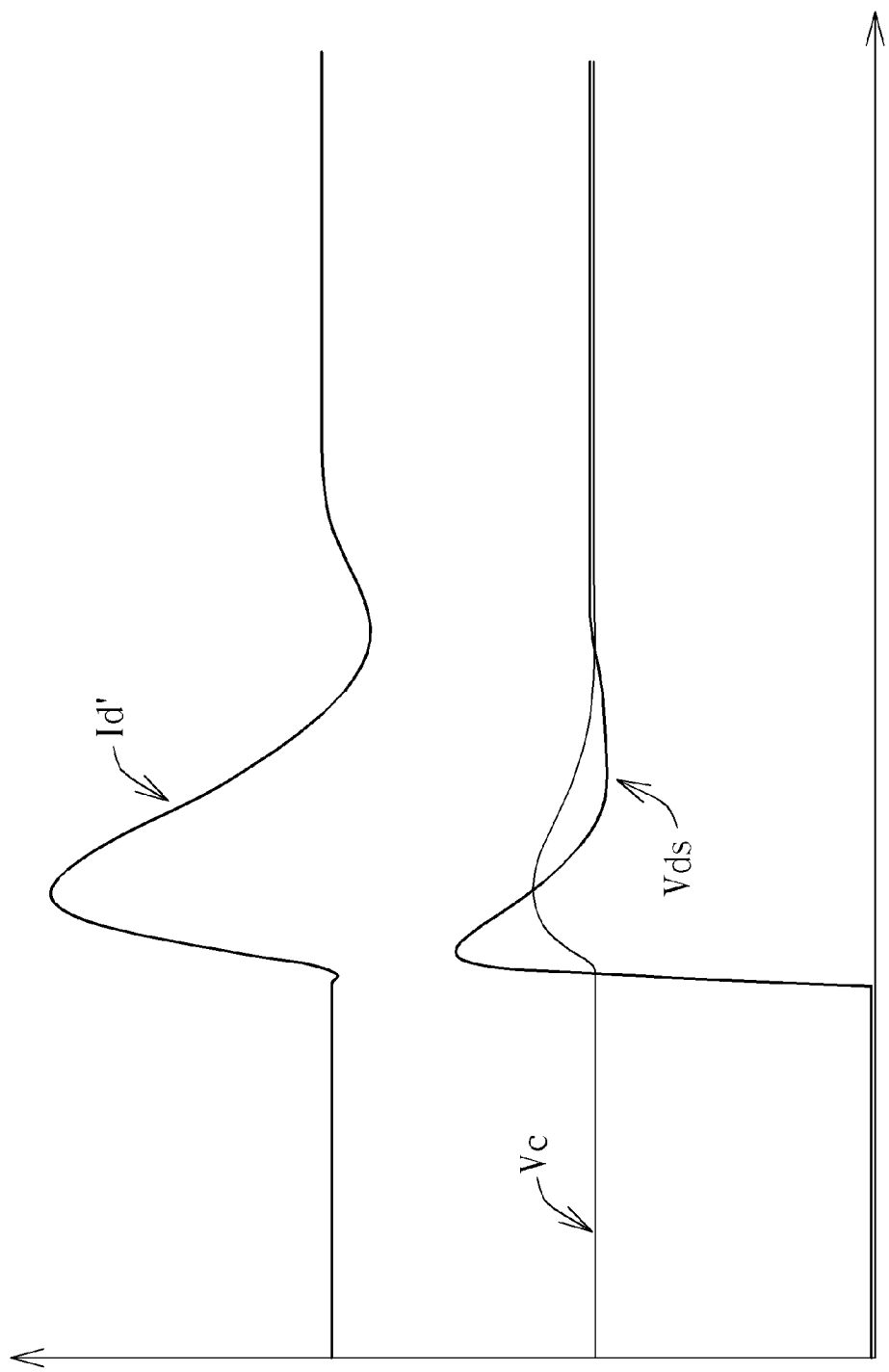
FIG. 10 is a diagram illustrating signal waveforms generated in a steady state operation of the snubber circuit shown in FIG. 7.

Please refer to FIG. 7-FIG. 10 together. FIG. 8 is a diagram illustrating signal waveforms generated using the power source V4 shown in FIG. 7 for power testing. FIG. 9 is a diagram illustrating signal waveforms generated using the power source V4 shown in FIG. 7 which outputs a high voltage first and then a low voltage. FIG. 10 is a diagram illustrating signal waveforms generated in a steady state operation of the snubber circuit 700 shown in FIG. 7. As shown in FIG. 8, due to an increase in a duration of reverse flow of the primary-side ring current Id' (i.e. a discharge duration of the capacitor C6 increases), a relative maximum voltage level VP' of the voltage signal Vds is lower than a voltage level VS' of the voltage signal Vc. In addition, the relative maximum voltage level VP' is also lower than a voltage level VL' of the voltage signal Vds generated when the primary-side ring current Id' has a minimum value. It should be noted that the increase in the duration of reverse flow of the primary-side ring current Id' represents a resistance region RD provided by the buffer device 720. Hence, the capacitor C7 may discharge gradually with the aid of the resistance region RD (as can been seen from the waveform of the voltage signal Vc shown in FIG. 9), and the voltage signal Vds converges gradually due to the discharge of the capacitor C7, thus allowing a voltage across the two terminals of the switch circuit 730 (the terminal TD and ground) to return to a normal level. Additionally, the waveform diagram illustrated in FIG. 10 is similar to that illustrated in FIG. 5, which means that the proposed snubber circuit is capable of effectively limiting a ring current (generated due to fast switching) without a bleeder resistor. Hence, the proposed snubber circuit may reduce/eliminate power losses in high speed switching applications.

Figure 11:
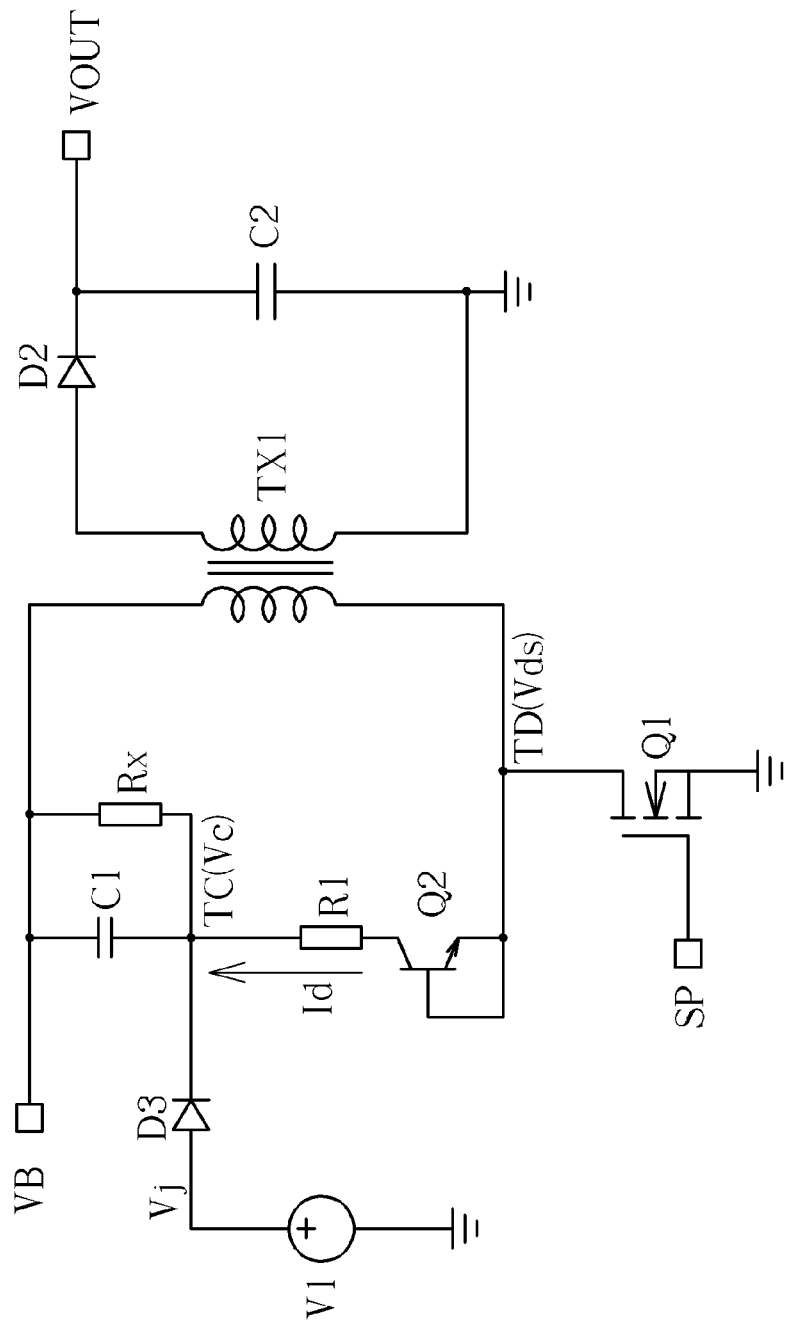
FIG. 11 is another implementation of the snubber circuit shown in FIG. 6.

Please note that the aforementioned architecture of the buffer device is for illustrative purposes only and is not meant to be a limitation of the present invention. For example, the proposed buffer device may be implemented by a bipolar junction transistor (BJT) whose base and emitter are electrically connected to each other. Please refer to FIG. 11, which is another implementation of the snubber circuit 600 shown in FIG. 6. The circuit architecture shown in FIG. 11 is based on that shown in FIG. 1, wherein the main difference therebetween is that the diode D1 shown in FIG. 1 is replaced by an NPN BJT Q2 shown in FIG. 11. The NPN BJT Q2 may be used to implement the buffer device 620 shown in FIG. 6. As shown in FIG. 11, an emitter of the NPN BJT Q2 is electrically connected to the terminal TD, a collector of the NPN BJT Q2 is electrically connected to the terminal TC, and a base of the NPN BJT Q2 is electrically connected to the emitter.

Figure 12:
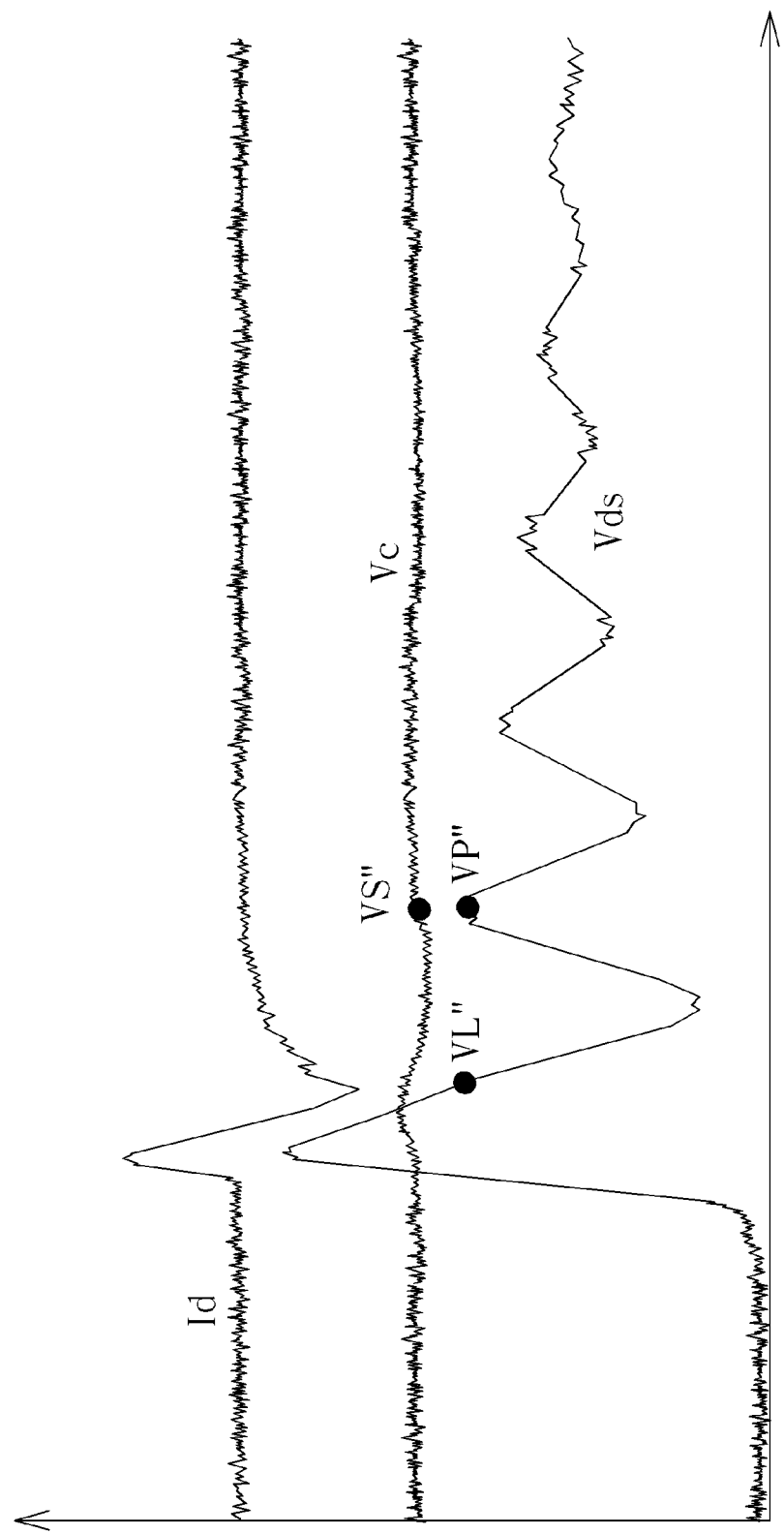
FIG. 12 is a diagram illustrating signal waveforms generated using the power source shown in FIG. 11 for power testing.

Please refer to FIG. 12, which is a diagram illustrating signal waveforms generated using the power source V1 shown in FIG. 11 for power testing. When the primary-side ring current Id flows out of the collector of the NPN BJT Q2, the NPN BJT Q2 may be regarded as a current source. Hence, the duration of reverse flow of the primary-side ring current Id may be extended such that a relative maximum voltage level VP" of the voltage signal Vds is lower than a voltage level VS" of the voltage signal Vc. In addition, the relative maximum voltage level VP" may be lower than a voltage level VL" of the voltage signal Vds generated when the primary-side ring current Id has a minimum value. In other words, a snubber circuit including the capacitor C1, the resistor R1, the resistor RX and the NPN BJT Q2 may have negative feedback characteristics.

Figure 13:
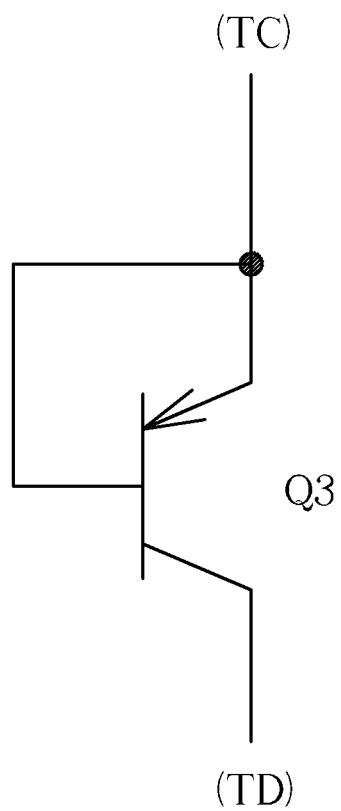
FIG. 13 is an implementation of the buffer device shown in FIG. 6.

It should be noted that a PNP BJT whose base and emitter are electrically connected to each other may be used. Please refer to FIG. 13, which is an implementation of the buffer device 620 shown in FIG. 6. In a case where the NPN BJT Q2 shown in FIG. 11 is replaced by a PNP BJT Q3, a collector of the PNP BJT Q3 is electrically connected to the terminal TD, and an emitter of the PNP BJT Q3 is electrically connected to the terminal TC.

Please refer to FIG. 6 again. The snubber circuit 600 shown in FIG. 6 may further include a resistive element (not shown in FIG. 6), wherein the resistive element is coupled in parallel with the capacitor 610 shown in FIG. 6 and is arranged for adjusting a voltage drop across the capacitor 610. For example, as shown in FIG. 11, the resistor Rx is coupled in parallel with the capacitor C1, and is arranged for adjusting a voltage drop across the capacitor C1. However, after reading the above paragraphs directed to FIG. 6-FIG. 10, a person skilled in the art should understand that the proposed snubber circuit may effectively limit a ring current without a bleeder resistor.

FIG. 14-FIG. 18 illustrate a plurality of embodiments where the proposed snubber circuit/buffer device is used to replace a conventional circuit. To facilitate an understanding of the present invention, a schematic symbol of a diode is used to represent a schematic symbol of the proposed buffer device, wherein the first conduction mode of the proposed buffer device may correspond to a forward conduction mode of a diode, and the second conduction mode of the proposed buffer device may correspond to a reverse conduction mode of the diode. However, after reading the above paragraphs directed to FIG. 1-FIG. 13, a person skilled in the art should understand that the proposed buffer device is not a conventional diode. The use of the diode symbol is for illustrative purposes only.

Figure 14:
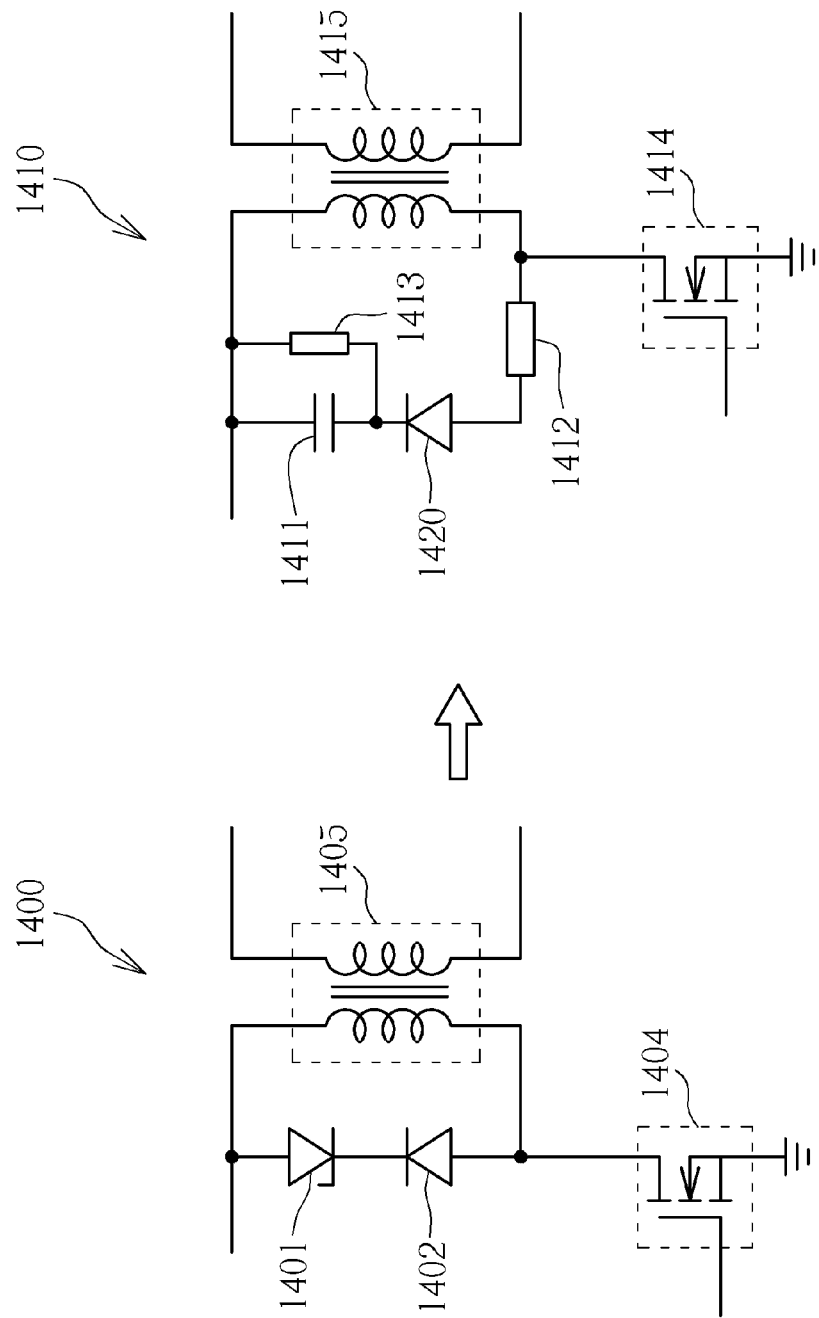
FIG. 14 is a diagram illustrating an improved power supply unit used in a personal computer and/or a server according to an embodiment of the present invention.

Please refer to FIG. 14, which is a diagram illustrating an improved power supply unit (PSU) used in a personal computer (PC) and/or a server according to an embodiment of the present invention. The left portion of FIG. 14 illustrates a circuit diagram of a primary side of a transformer of a conventional standby power converter 1400 in a PSU. The standby power converter 1400 includes a Zener diode 1401, a diode 1402, a switch 1404 and a transformer 1405. The right portion of FIG. 14 illustrates a circuit diagram of a primary side of a transformer of an exemplary standby power converter 1410 according to an embodiment of the present invention. The standby power converter 1410 may include a capacitor 1411, a plurality of resistors 1412 and 1413, a switch 1414, a transformer 1415 and a buffer device 1420, wherein the buffer device 1420 may be implemented by the buffer device 620 shown in FIG. 6. A snubber circuit included in the standby power converter 1410, which is implemented by the capacitor 1411, the resistors 1412 and 1413 and the buffer device 1420, may absorb a voltage surge across two terminals of the switch 1414, wherein the voltage surge is induced by leakage inductance on the primary side of the transformer 1415 while the switch 1414 is turned off. In addition, the snubber circuit included in the standby power converter 1410 may release a surge energy absorbed by the capacitor 1411 to a power supply terminal. In other words, the proposed snubber circuit may recycle the surge energy. In this embodiment, the standby power converter 1410 may have at least a 1% increase in power conversion efficiency as compared to the conventional standby power converter 1400.

Figure 15:
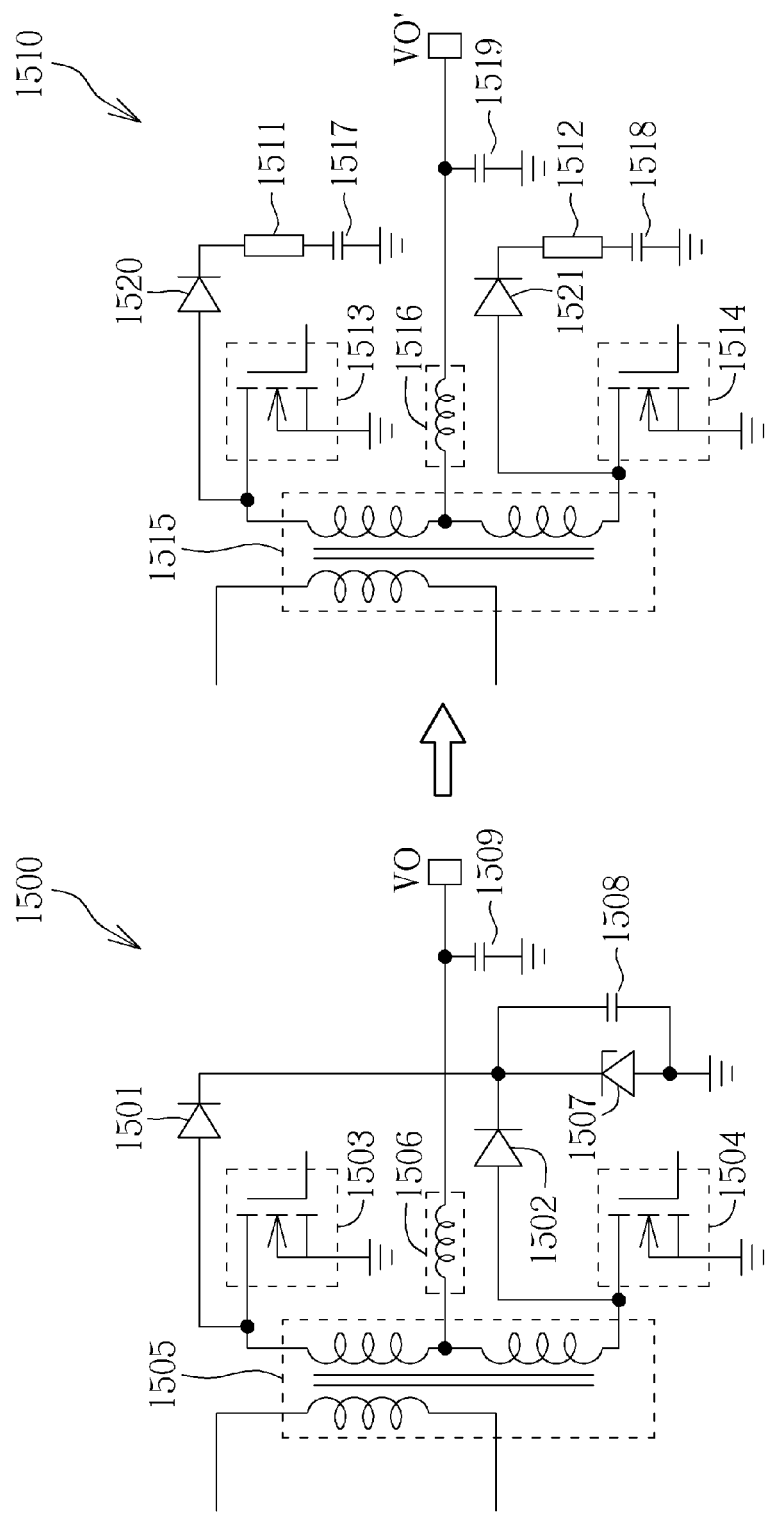
FIG. 15 is a diagram illustrating another improved power supply unit used in a personal computer and/or a server according to another embodiment of the present invention.

Please refer to FIG. 15, which is a diagram illustrating another improved PSU used in a PC and/or a server according to another embodiment of the present invention. The left portion of FIG. 15 illustrates a circuit diagram of a secondary side of a transformer 1505 (a synchronous rectification circuit 1500) of a conventional DC-to-DC converter in a PSU. The synchronous rectification circuit 1500 includes a plurality of diodes 1501 and 1502, a plurality of switches 1503 and 1504, an inductor 1506, a Zener diode 1507, a plurality of capacitors 1508 and 1509, and an output terminal VO. The right portion of FIG. 15 illustrates a circuit diagram of a secondary side of a transformer 1515 (a synchronous rectification circuit 1510) in a PSU according to an embodiment of the present invention. The synchronous rectification circuit 1510 may include a plurality of resistors 1511 and 1512, a plurality of switches 1513 and 1514, an inductor 1516, a plurality of capacitors 1517-1519, an output terminal VO' and a plurality of buffer devices 1520 and 1521, wherein each of the buffer devices 1520 and 1521 may be implemented by the buffer device 620 shown in FIG. 6. After reading the above paragraphs directed to FIG. 1-FIG. 13, a person skilled in the art should understand that a snubber circuit, implemented by the buffer devices 1520 and 1521, the resistors 1511 and 1512 and the capacitors 1517 and 1518, may extend a discharge duration of a capacitor by using the long reverse recovery time of the buffer devices 1520 and 1521. The power loss in the synchronous rectification circuit 1510 may be reduced accordingly.

Figure 16:
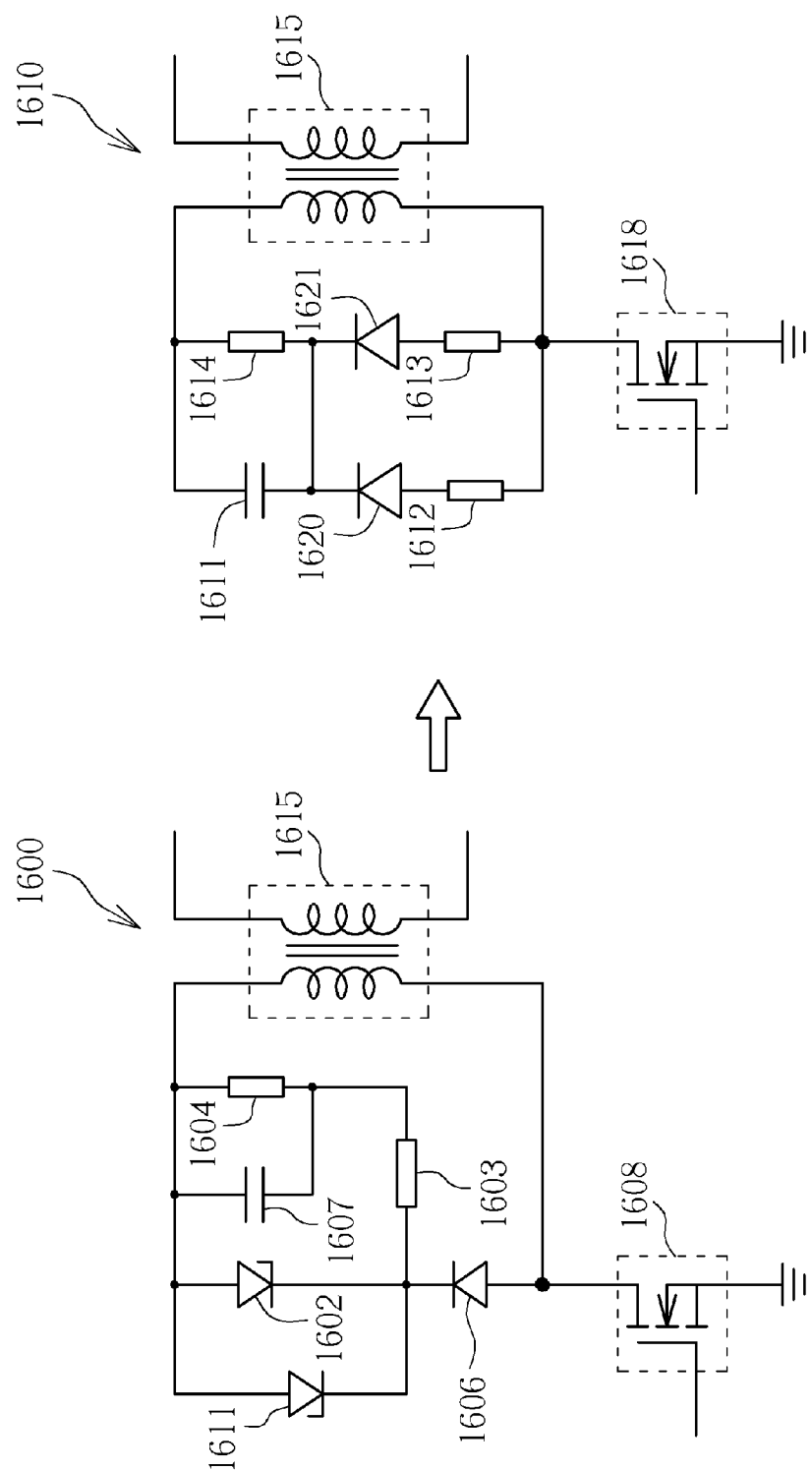
FIG. 16 is a diagram illustrating an improved power supply unit used in a printer according to an embodiment of the present invention.

Please refer to FIG. 16, which is a diagram illustrating an improved PSU used in a printer according to an embodiment of the present invention. The left portion of FIG. 16 illustrates a circuit diagram of a primary side of a transformer of a conventional DC-to-DC converter 1600 in a PSU. The DC-to-DC converter 1600 includes a plurality of Zener diodes 1601 and 1602, a plurality of resistors 1603 and 1604, a transformer 1605, a diode 1606, a capacitor 1607 and a switch 1608. The right portion of FIG. 16 illustrates a circuit diagram of a primary side of a transformer of an exemplary DC-to-DC converter 1610 in a PSU according to an embodiment of the present invention. The DC-to-DC converter 1610 may include a capacitor 1611, a plurality of resistors 1612-1614, a transformer 1615, a plurality of buffer devices 1620 and 1621, and a switch 1618, wherein each of the buffer devices 1620 and 1621 may be implemented by the buffer device 620 shown in FIG. 6. The operating principle of the DC-to-DC converter 1610 is similar/identical to the above described. In other words, a snubber circuit of the DC-to-DC converter 1610 (implemented by the buffer devices 1620 and 1621 and the capacitor 1611) may absorb a voltage surge across two terminals of the switch 1618, wherein the voltage surge is induced by leakage inductance on the primary side of the transformer 1615 while the switch 1618 is turned off. In addition, the snubber circuit may release a surge energy absorbed by the capacitor 1611 to a power supply terminal. In other words, the proposed snubber circuit may recycle the surge energy. In this embodiment, the DC-to-DC converter 1610 may have at least a 0.5% increase in power conversion efficiency as compared to the conventional DC-to-DC converter 1600.

Figure 17:
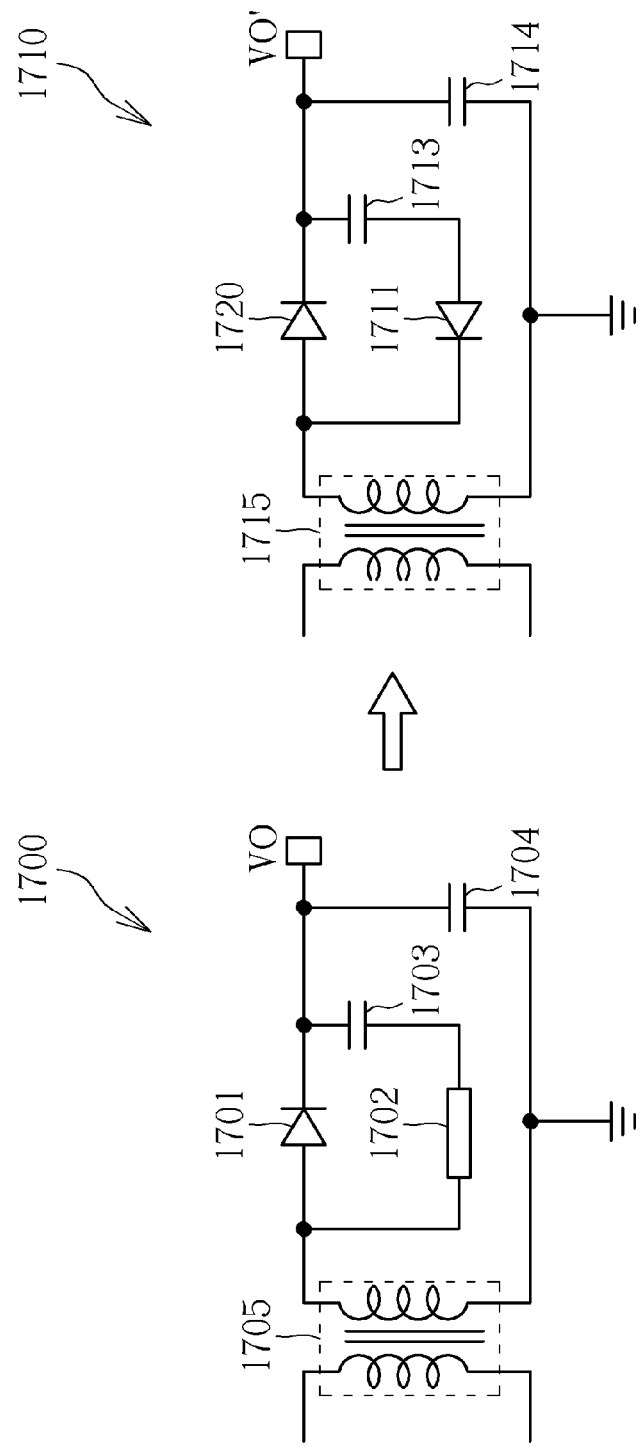
FIG. 17 is a diagram illustrating another improved power supply unit used in a printer according to another embodiment of the present invention.

Please refer to FIG. 17, which is a diagram illustrating another improved PSU used in a printer according to another embodiment of the present invention. The left portion of FIG. 17 illustrates a circuit diagram of a secondary side of a transformer of a conventional DC-to-DC converter 1700 in a PSU. The DC-to-DC converter 1700 includes a diode 1701, a resistor 1702, a plurality of capacitors 1703 and 1704, a transformer 1705 and an output terminal VO. The right portion of FIG. 17 illustrates a circuit diagram of a secondary side of a transformer of an exemplary DC-to-DC converter 1710 in a PSU according to an embodiment of the present invention. The DC-to-DC converter 1710 may include a buffer device 1711, a diode 1720, a plurality of capacitors 1713 and 1714, a transformer 1715 and an output terminal VO', wherein the buffer device 1711 may be implemented by the buffer device 620 shown in FIG. 6. The operating principle of the DC-to-DC converter 1710 is similar/identical to the above described. In this embodiment, the DC-to-DC converter 1710 may have at least a 0.5% increase in power conversion efficiency by employing the buffer device 1711.

Figure 18:
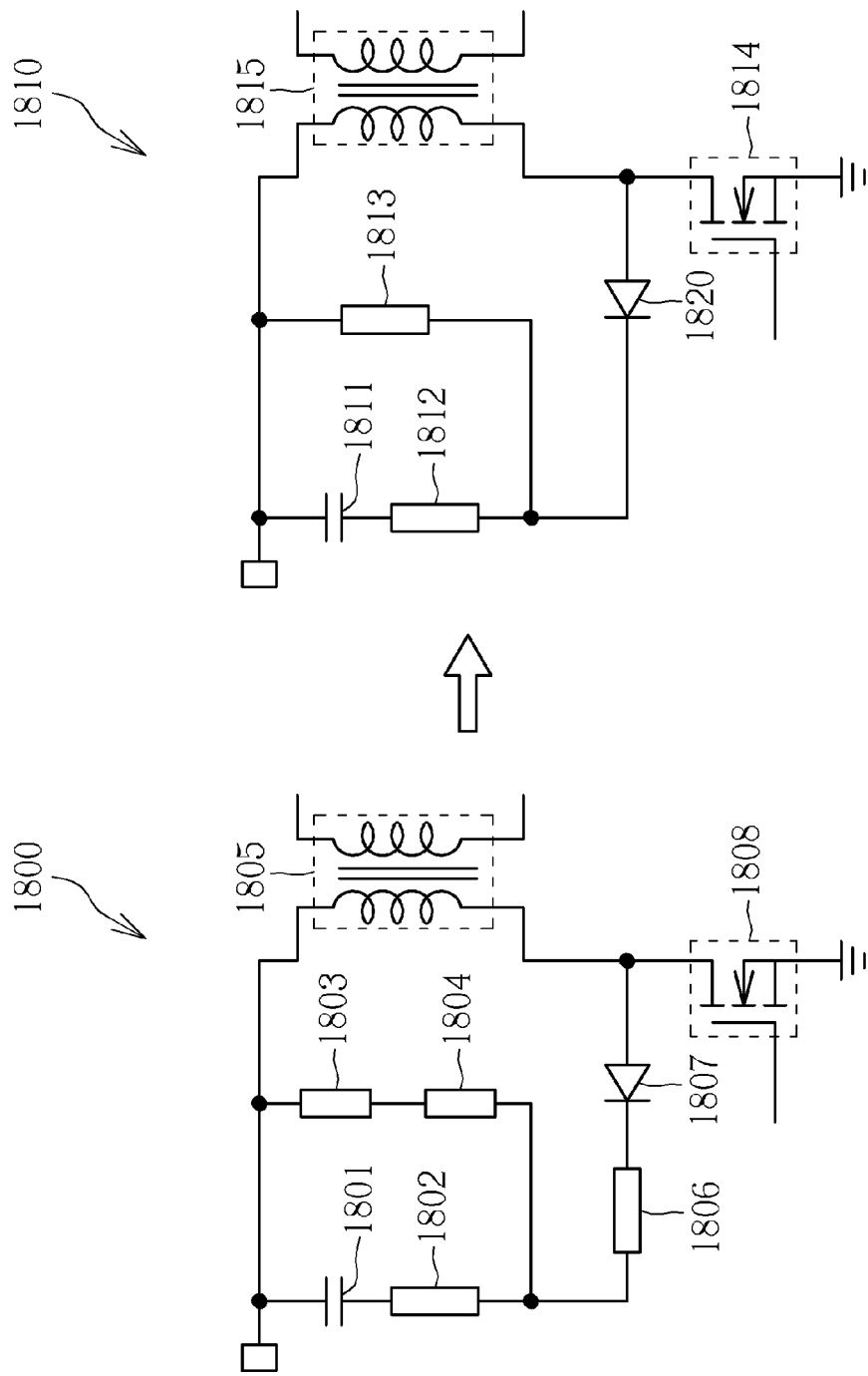
FIG. 18 is a diagram illustrating an improved power supply unit used in an adaptor/charger/set-top box/lighting apparatus according to an embodiment of the present invention.

Please refer to FIG. 18, which is a diagram illustrating an improved PSU used in an adaptor/charger/set-top box/lighting apparatus according to an embodiment of the present invention. The left portion of FIG. 18 illustrates a circuit diagram of a primary side of a transformer of a conventional DC-to-DC converter 1800 in a PSU. The DC-to-DC converter 1800 includes a capacitor 1801, a plurality of resistors 1802-1804, a transformer 1805, a core bit 1806, a diode 1807 and a switch 1808. The right portion of FIG. 18 illustrates a circuit diagram of a primary side of a transformer of an exemplary DC-to-DC converter 1810 in a PSU according to an embodiment of the present invention. The DC-to-DC converter 1810 may include a capacitor 1811, a plurality of resistors 1812-1813, a switch 1814, a transformer 1815 and a buffer device 1820, wherein the buffer device 1820 may be implemented by the buffer device 620 shown in FIG. 6. The operating principle of the DC-to-DC converter 1810 is similar/identical to the above described. A snubber circuit included in the DC-to-DC converter 1810 may absorb a voltage surge across two terminals of the switch 1814, wherein the voltage surge is induced when the switch 1814 is turned off. In addition, the snubber circuit may release a surge energy absorbed by the capacitor 1811 to a power supply terminal. In this embodiment, the DC-to-DC converter 1810 may have at least a 0.5% increase in power conversion efficiency as compared to the conventional DC-to-DC converter 1800, and reduce electromagnetic interference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A snubber circuit, comprising:
   a capacitor; and
   a buffer device, having a first terminal and a second terminal, wherein the first terminal is electrically connected to the capacitor; when the buffer device operates in a first conduction mode, a charge current flows from the second terminal to the first terminal through the buffer device; and when the buffer device switches from the first conduction mode to a second conduction mode, the buffer device generates a discharge current which flows from the first terminal to the second terminal through the buffer device over a specific period of time, such that after the buffer device enters the second conduction mode, a relative maximum voltage level appearing first at the second terminal is lower than a voltage level at the first terminal, and a voltage signal at the second terminal converges gradually after the buffer device enters the second conduction mode;
   wherein the relative maximum voltage level is further lower than the voltage level at the second terminal generated when the discharge current flows from the first terminal to the second terminal and reaches a minimum value.

2. The snubber circuit of claim 1, wherein when the buffer device operates in the first conduction mode, the charge current flows through the buffer device to charge the capacitor; and when the buffer device operates in the second conduction mode, the discharge current flows through the buffer device to discharge the capacitor.

3. The snubber circuit of claim 1, wherein when the buffer device switches from the first conduction mode to the second conduction mode, the charge current decreases to zero before the buffer device generates the discharge current.

4. The snubber circuit of claim 1, wherein the buffer device comprises:
   a charge storage device;
   a first conversion circuit, coupled to the charge storage device and electrically connected between the first terminal and the second terminal, the first conversion circuit arranged for converting the charge current into charges, and storing the converted charges into the charge storage device when the buffer device operates in the first conduction mode; and
   a second conversion circuit, coupled to the charge storage device and electrically connected between the first terminal and the second terminal, the second conversion circuit arranged for converting the charges stored in the charge storage device to generate the discharge current when the buffer device switches from the first conduction mode to the second conduction mode.

5. The snubber circuit of claim 4, wherein when the buffer device switches from the first conduction mode to the second conduction mode, the first conversion circuit converts the charge current until the charge current decreases to zero, and then the second conversion circuit converts the charges stored in the charge storage device to generate the discharge current.

6. The snubber circuit of claim 1, further comprising:
a resistive element, coupled in parallel with the capacitor, the resistive element arranged for adjusting a voltage drop across the capacitor.

7. The snubber circuit of claim 1, wherein the buffer device comprises an NPN bipolar junction transistor, an emitter of the NPN bipolar junction transistor is electrically connected to the second terminal, a collector of the NPN bipolar junction transistor is electrically connected to the first terminal, and a base of the NPN bipolar junction transistor is electrically connected to the emitter.

8. The snubber circuit of claim 1, wherein the buffer device comprises a PNP bipolar junction transistor, a collector of the PNP bipolar junction transistor is electrically connected to the second terminal, an emitter of the PNP bipolar junction transistor is electrically connected to the first terminal, and a base of the PNP bipolar junction transistor is electrically connected to the emitter.

9. A buffering method for a snubber circuit, comprising:
when a buffer device of the snubber circuit operates in a first conduction mode, conducting a charge current flowing through the buffer device, wherein a first terminal of the buffer device is electrically connected to a capacitor of the snubber circuit, and the charge current flows from a second terminal of the buffer device to the first terminal through the buffer device; and
when the buffer device switches from the first conduction mode to a second conduction mode, generating a discharge current which flows from the first terminal to the second terminal through the buffer device over a specific period of time, such that after the buffer device enters the second conduction mode, a relative maximum voltage level appearing first at the second terminal is lower than a voltage level at the first terminal, and a voltage signal at the second terminal converges gradually after the buffer device enters the second conduction mode;
wherein the relative maximum voltage level is further lower than a voltage level at the second terminal generated when the discharge current flows from the first terminal to the second terminal and reaches a minimum value.

10. The buffering method of claim 9, wherein the step of generating the discharge current is performed after the charge current decreases to zero.

11. The buffering method of claim 9, wherein the step of conducting the charge current flowing through the buffer device comprises:
converting the charge current into charges, and storing the converted charges; and
the step of generating the discharge current which flows from the first terminal to the second terminal through the buffer device comprises:
converting the stored charges to generate the discharge current.

12. The buffering method of claim 11, wherein the step of converting the stored charges to generate the discharge current is performed after the charge current decreases to zero.

13. The buffering method of claim 9, further comprising:
utilizing a resistive element coupled in parallel with the capacitor to adjust a voltage drop across the capacitor.

14. The buffering method of claim 9, wherein the buffer device comprises an NPN bipolar junction transistor, and the buffering method further comprises:
electrically connecting an emitter of the NPN bipolar junction transistor to the second terminal;
electrically connecting a collector of the NPN bipolar junction transistor to the first terminal; and
electrically connecting a base of the NPN bipolar junction transistor to the emitter.

15. The buffering method of claim 9, wherein the buffer device comprises a PNP bipolar junction transistor, and the buffering method further comprises:
electrically connecting a collector of the PNP bipolar junction transistor to the second terminal;
electrically connecting an emitter of the PNP bipolar junction transistor to the first terminal; and
electrically connecting a base of the PNP bipolar junction transistor to the emitter.

\* \* \* \* \*